United States Patent
Skalbeck et al.

(10) Patent No.: US 8,465,040 B2
(45) Date of Patent: Jun. 18, 2013

(54) DETACHABLE GOOSENECK TRAILER LOCKING MECHANISM

(76) Inventors: Todd Skalbeck, Willmar, MN (US); Gary Knudsen, Kandiyohi, MN (US)

(*) Notice: Subject to any disclaimer, the term of this patent is extended or adjusted under 35 U.S.C. 154(b) by 0 days.

(21) Appl. No.: 13/372,808

(22) Filed: Feb. 14, 2012

(65) Prior Publication Data
US 2012/0205895 A1    Aug. 16, 2012

Related U.S. Application Data

(60) Provisional application No. 61/442,687, filed on Feb. 14, 2011.

(51) Int. Cl.
  *B62D 53/06* (2006.01)
(52) U.S. Cl.
  USPC ............... 280/417.1; 280/425.2; 280/441.2; 280/425.1
(58) Field of Classification Search
  USPC .............. 280/417.1, 425.2, 441.2, 425.1
  See application file for complete search history.

(56) References Cited

U.S. PATENT DOCUMENTS

| | | | | |
|---|---|---|---|---|
| 4,423,885 A * | 1/1984 | Camey et al. | ............... | 280/441.2 |
| 5,415,425 A * | 5/1995 | Zerbe et al. | ............... | 280/441.2 |
| 6,932,372 B2 * | 8/2005 | French et al. | ............... | 280/417.1 |
| 2003/0042705 A1 * | 3/2003 | French et al. | ............... | 280/417.1 |
| 2004/0084874 A1 * | 5/2004 | McDougall et al. | ....... | 280/441.2 |
| 2010/0194074 A1 * | 8/2010 | Jamieson | ............... | 280/441.2 |

* cited by examiner

*Primary Examiner* — Tashiana Adams
*Assistant Examiner* — Marlon Arce
(74) *Attorney, Agent, or Firm* — Geiser Law, PLLC; Greg N. Geiser

(57) ABSTRACT

A trailer assembly including a load deck and a detachable gooseneck. The load deck includes a rotatable shaft and latch wedge and the detachable gooseneck includes a hook. The attachment of the gooseneck to the load deck will result in the rotation of the shaft and latch wedge and engage the latch wedge and hook preventing detachment of the gooseneck and load deck. Misalignment of the gooseneck and load deck may be compensated for by a chamfer of the hook and a v-shaped groove.

15 Claims, 3 Drawing Sheets

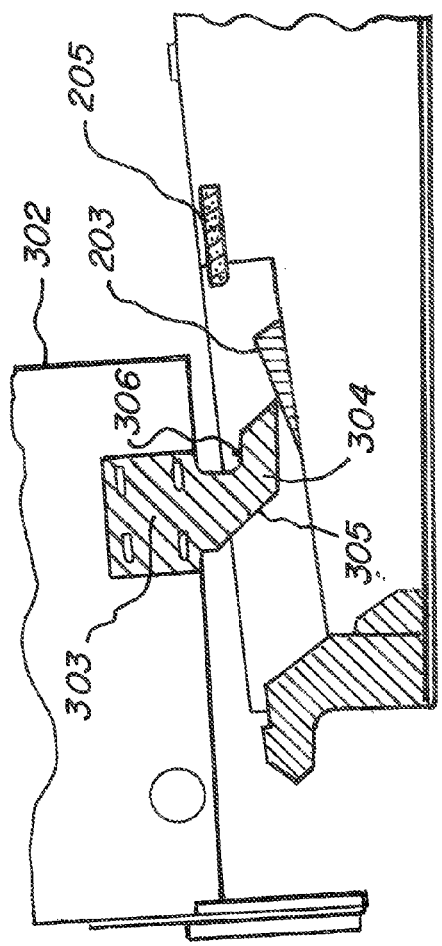
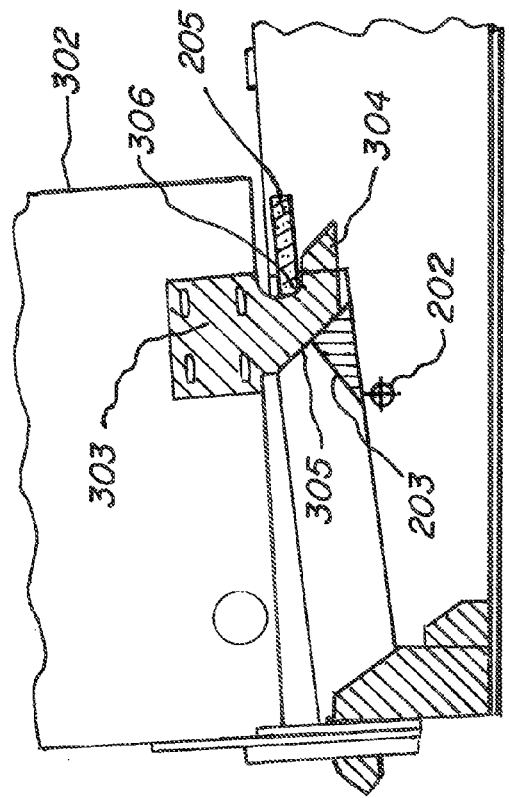
FIG. 2A
FIG. 2B

DETACHABLE GOOSENECK TRAILER LOCKING MECHANISM

CROSS REFERENCE TO RELATED APPLICATIONS

This application claims the benefit of U.S. Provisional Application No. 61/442,687, filed Feb. 14, 2011 to the above named inventors.

FEDERALLY SPONSORED RESEARCH

Not Applicable

SEQUENCE LISTING OR PROGRAM

Not Applicable

FIELD OF THE INVENTION

The present invention relates to trailers and more specifically latching and locking mechanisms for detachable gooseneck trailers.

BACKGROUND OF THE INVENTION

On a standard trailer, equipment is loaded on and off of the trailer from the rear using ramps. The angle of these ramps will depend upon the height of the trailer. For some equipment, particularly heavy industrial equipment, the angle of these ramps may be too steep to allow loading and offloading of this equipment. In addition, the height of a traditional trailer may be too high to allow adequate clearance of bridges and roads when equipment is loaded on the trailer. To combat these problems, a detachable gooseneck trailer is used. A detachable gooseneck trailer includes a trailer deck and gooseneck removably attached to the towing vehicle and trailer deck. This allows the gooseneck to be detached from the trailer and equipment removed from the front of trailer.

The process of reattaching the gooseneck after it has been detached is often an area of difficulty for trailer operators as the alignment of the gooseneck with the trailer deck is critical. An improper alignment may result in damage to the trailer deck or the gooseneck. This process of alignment and attachment becomes even more difficult when the trailer is situated on an uneven or ungraded surface.

SUMMARY OF THE INVENTION

Accordingly, one object of the present invention is to provide an improved detachable gooseneck trailer that will compensate for a faulty alignment and make attachment easier when a trailer is situated on uneven ground. A further object of the present invention, is to provide an attachment assembly that can be easily repaired and prevent permanent damage to the trailer assembly should the trailer and gooseneck be misaligned.

A detachable gooseneck trailer assembly is provided that makes trailer and gooseneck alignment and attachment and detachment easier and more efficient. The assembly includes a trailer deck with an attachment end and a detachable gooseneck with a lower attachment surface and upper vehicle attachment surface. The trailer deck attachment end contains a trailer cross box. The trailer cross box includes a shaft rotatably received within the cross box, a v-shaped grove, and a latch shear block mounted adjacent to the narrow end of the v-shaped grove. A latch wedge is mounted on the shaft and rotates with the shaft. The latch sheer block is attached to the trailer cross box with a plurality of shear fasteners.

The detachable gooseneck lower attachment surface contains a latch hook. The latch hook defines a distal end and contains a latch wedge engagement surface and a latch shear block engagement surface. The distal end is chamfered so that the distal end easily displaces the latch wedge and is frictionally received against the latch shear block.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein:

FIG. 2A is a side view of the internal components of the trailer assembly with the assembly detached, according to the present invention;

FIG. 2B is a side view of the internal components of the trailer assembly with the assembly attached, according to the present invention;

DETAILED DESCRIPTION OF THE INVENTION

Figure 1:
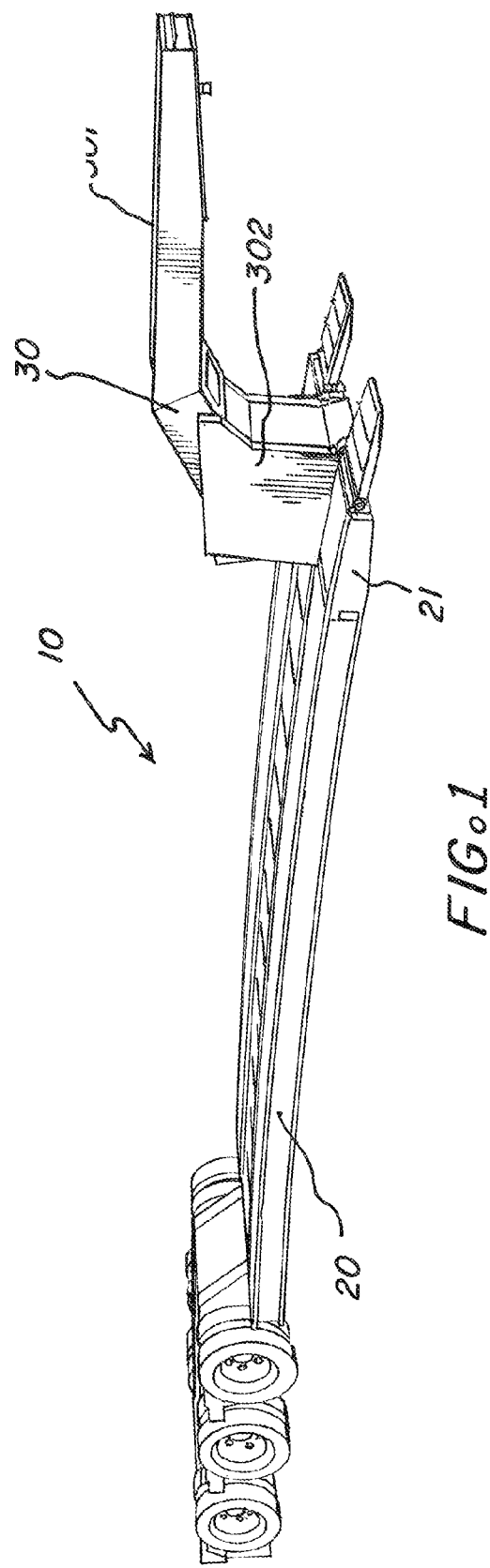
FIG. 1 is a perspective view of the trailer, according to the present invention.
Figure 3:
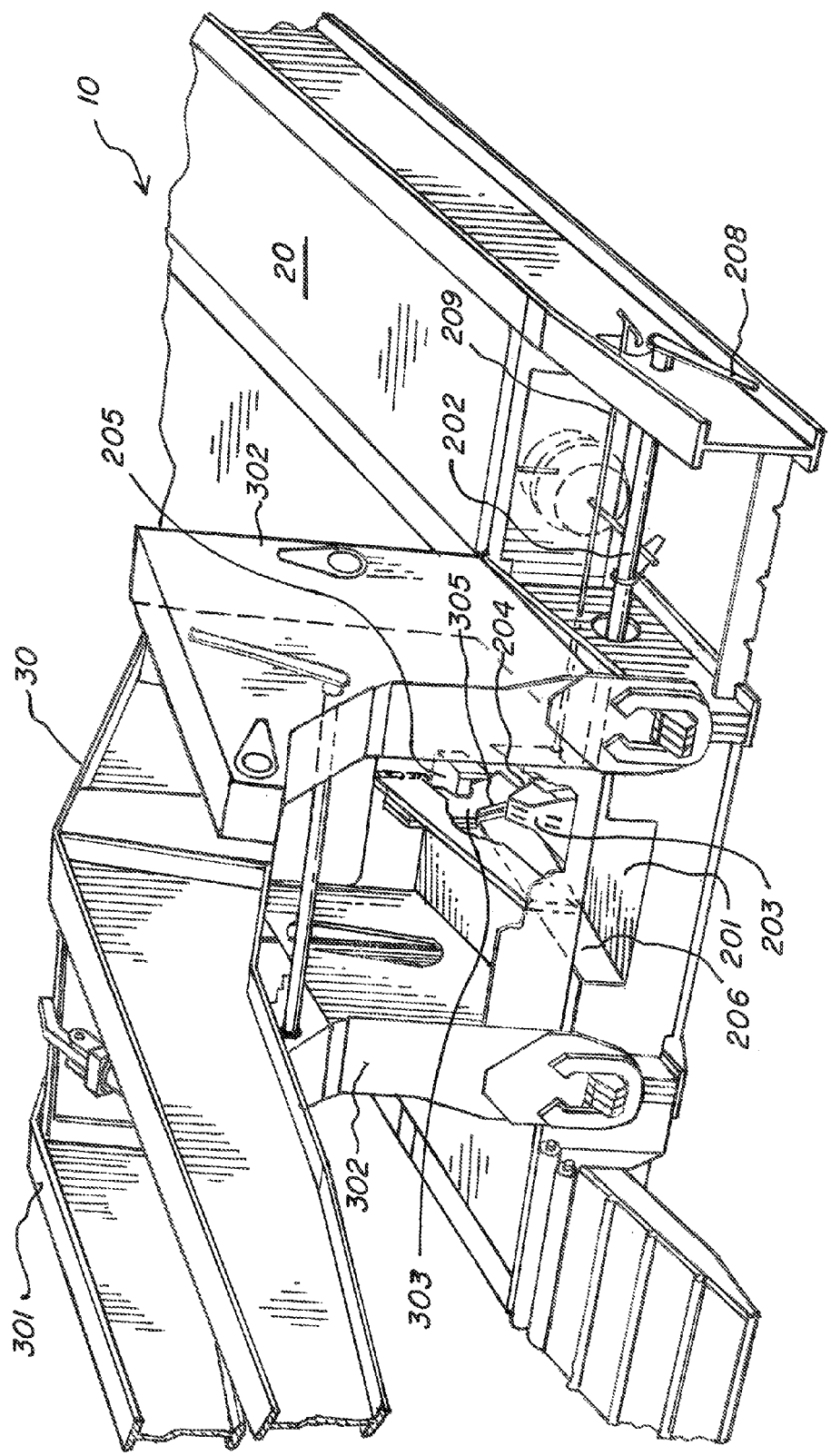
FIG. 3 is a close-up perspective view of the internal components of the trailer assembly with the assembly attached, according to the present invention.

Referring now to FIG. 1-3 there is shown an embodiment of the detachable gooseneck trailer assembly of the present invention, generally designated by the reference numeral 10.

A load deck 20 includes an attachment end 21. The attachment end 21 includes a cross box 201. The cross box 201 is perpendicular to the length of the load deck 20 and provides structural and mechanical support for the load deck and trailer assembly. A shaft 202 is rotatably received within with the cross box 201. The shaft 202 can be rotated by hand, pneumatic pressure, hydraulic pressure, electrical power, or spring tension. The shaft 202 may be spring loaded to return to a beginning position after it is rotated. The shaft 202 extends the width of the load deck 20 and includes a handle 208. The latch wedge 203 is mounted on the shaft 202. The latch wedge 203 includes a hook engagement surface 204. When the detachable gooseneck 30 and the load deck 20 are in the attached position, the hook engagement surface 204 will be in communication with and frictionally received by a latch engagement surface 305, wherein this engagement will prevent the disconnect of the load deck 20 and the gooseneck 30. In addition, a safety pin 209 may be used to prevent rotation of the shaft 202 when the latch wedge 203 is engaged with the latch engagement surface 305.

The cross box 201 includes a v-shaped groove 206 and a latch shear block 205. The latch shear block 205 is attached to the cross box 201 using a shear fastener and positioned at the narrow end of the v-shaped groove 206. The v-shaped groove 206 is a horizontal alignment tool to aide in the attachment of the detachable gooseneck 30 and the load deck 20. The shear fastener is used to prevent catastrophic failure of a misaligned connection of the detachable gooseneck 30 and the load deck 20. The latch shear block 205 is chamfered to allow for a connection with the latch hook 303 if the load deck 20 and the detachable gooseneck 30 are slightly misaligned in a vertical direction.

The detachable gooseneck 30 includes an upper vehicle attachment surface 301 and a lower attachment surface 302. The upper vehicle attachment surface 301 may contain a standard coupling pin for attachment to a fifth wheel or an automatic coupling. The lower attachment surface 302 includes a latch hook 303. The latch hook 303 defines a distal end 304 and includes a latch wedge engagement surface 305 and a latch shear block engagement surface 306. The distal end 304 is chamfered at an angle similar to the chamfer of the latch shear block 205 to allow the latch hook 303 to engage the latch shear block 205 if the load deck 20 or the detachable gooseneck 30 is not positioned at the proper height.

In operation, the trailer assembly 10 is towed to a work location. Upon arrival, an operator will disengage the detachable gooseneck 30 from load deck 20. To disengage, the operator will rotate the shaft 202 resulting in the latch wedge 203 rotating out of engagement with the latch hook 303. Disengagement can be accomplished by manually, electrically, pneumatically, or hydraulically rotating shaft 202 to the disengaged position. If the safety pin 209 is used, the operator must remove this pin to allow the shaft 202 to rotate. In the preferred embodiment, the latch wedge 203 and the shaft 202 will rotate in a range of 20 degrees. After disengagement, the operator will return to the vehicle and pull the vehicle and the detachable gooseneck 30 away from the load deck 20. Because the detachable gooseneck 30 has been disengaged from the load deck 20, the latch hook 303 is allowed to pass by the latch wedge 203. The load can then be removed off of the front of the load deck 20.

To reattach the detachable gooseneck 30 to the load deck 20, the operator will first put the load deck 20 and the gooseneck 30 in alignment by sighting up the connections. The operator will then back the vehicle with the gooseneck 30 attached into the load deck 20. During this process the hook 303 will displace the latch wedge 203 and engage the latch shear block 205. Upon engagement, the latch wedge engagement surface 305 and the hook engagement surface 204 will be in frictional communication preventing the hook 303 from disengaging from the shear block 205 and keeping the load deck 20 and the detachable gooseneck 30 securely attached. The latch wedge 203 can be manually engaged by rotating the shaft 202 using the handle 208 or automatically by using pneumatic pressure, a spring or set of springs under tension, hydraulic pressure, or electric power.

Once the latch wedge 203 is engaged, the operator can engage the safety pin 209 to prevent the latch wedge 203 from being disengaged with the hook 303. Any problems with horizontal alignment will be aided by the v-shaped groove 204 and any problems with vertical alignment aided by the chamfer of the hook 303 and the latch shear block 205. A major lapse of alignment will result in a shear of the shear fastener 204 and prevent catastrophic failure of the assembly.

The invention claimed is:

1. A trailer for transporting cargo and for attaching to a towing vehicle, the trailer comprising:
   a load deck, the load deck having an attachment end;
   a cross box located in the attachment end, the cross box being mounted perpendicular to length of the load deck, wherein the cross box provides structural and mechanical support for the load deck;
   a v-shaped groove centrally located within the cross box with the narrow end of the v-shaped groove distal to the attachment end;
   a latch shear block located at the narrow end on the v-shaped groove, the latch shear block including a chamfered edge;
   a shaft rotatably received within the cross box, the shaft extending from the v-shaped groove to the attachment end exterior;
   a latch wedge mounted on the shaft, the latch wedge including a hook engagement surface;
   a gooseneck, the gooseneck including a upper vehicle attachment surface and a lower attachment surface in removable communication with the attachment end; and
   a latch hook mounted on the lower attachment surface, the latch hook having a distal end, the distal end having an angle corresponding to the chamfered edge of the latch shear block, a latch wedge engagement surface in movable communication with the latch wedge, and a latch shear block engagement surface in movable communication with the latch shear block, wherein the latch hook removably engages the latch shear block and the latch wedge to secure the gooseneck to the attachment end.

2. A trailer for transporting cargo and for attaching to a towing vehicle as in claim 1, wherein a safety pin engages the latch wedge to prevent rotation of the shaft.

3. A trailer for transporting cargo and for attaching to a towing vehicle as in claim 1, wherein the shaft rotates within a range of 20 degrees.

4. A trailer for transporting cargo and for attaching to a towing vehicle as in claim 1, wherein the shaft is manually rotated.

5. A trailer for transporting cargo and for attaching to a towing vehicle as in claim 1, wherein the shaft is hydraulically rotated.

6. A trailer for transporting cargo and for attaching to a towing vehicle as in claim 1, wherein the shaft is pneumatically rotated.

7. A trailer for transporting cargo and for attaching to a towing vehicle as in claim 1, wherein the shaft is electrically rotated.

8. A trailer for transporting cargo and for attaching to a towing vehicle as in claim 1, wherein the shaft is rotated with a mechanical spring.

9. A trailer for transporting cargo and for attaching to a towing vehicle, the trailer comprising:
   a load deck, the load deck having an attachment end, the attachment end;
   a cross box located in the attachment end, the cross box being mounted perpendicular to length of the load deck, wherein the cross box provides structural and mechanical support for the load deck;
   a v-shaped groove centrally located within the cross box with the narrow end of the v-shaped groove distal to the attachment end;
   a latch shear block located at the narrow end on the v-shaped groove, the latch shear block including a chamfered edge;
   a shaft rotatably received within the cross box, the shaft extending from the v-shaped groove to the attachment end exterior;
   a latch wedge mounted on the shaft, the latch wedge including a hook engagement surface;
   a safety pin in communication with the latch wedge, wherein engagement of the safety pin prevents movement of the latch wedge;
   a gooseneck, the gooseneck including a upper vehicle attachment surface and a lower attachment surface in removable communication with the attachment end; and a latch hook mounted on the lower attachment surface, the latch hook having a distal end, the distal end having an angle corresponding to the chamfered edge of the latch shear block, a latch wedge engagement surface in movable communication with the latch wedge, and a latch shear block engagement surface in movable communication with the latch shear block, wherein the latch hook removably engages the latch shear block and the latch wedge to secure the gooseneck to the attachment end.

10. A trailer for transporting cargo and for attaching to a towing vehicle as in claim 9, wherein the shaft rotates within a range of 20 degrees.

11. A trailer for transporting cargo and for attaching to a towing vehicle as in claim 9, wherein the shaft is manually rotated.

12. A trailer for transporting cargo and for attaching to a towing vehicle as in claim 9, wherein the shaft is hydraulically rotated.

13. A trailer for transporting cargo and for attaching to a towing vehicle as in claim 9, wherein the shaft is pneumatically rotated.

14. A trailer for transporting cargo and for attaching to a towing vehicle as in claim 9, wherein the shaft is electrically rotated.

15. A trailer for transporting cargo and for attaching to a towing vehicle as in claim 9, wherein the shaft is rotated with a mechanical spring.

\* \* \* \* \*